July 9, 1929.  E. P. RENAUX  1,720,494
BRAKE OPERATING CONNECTION
Filed April 15, 1926
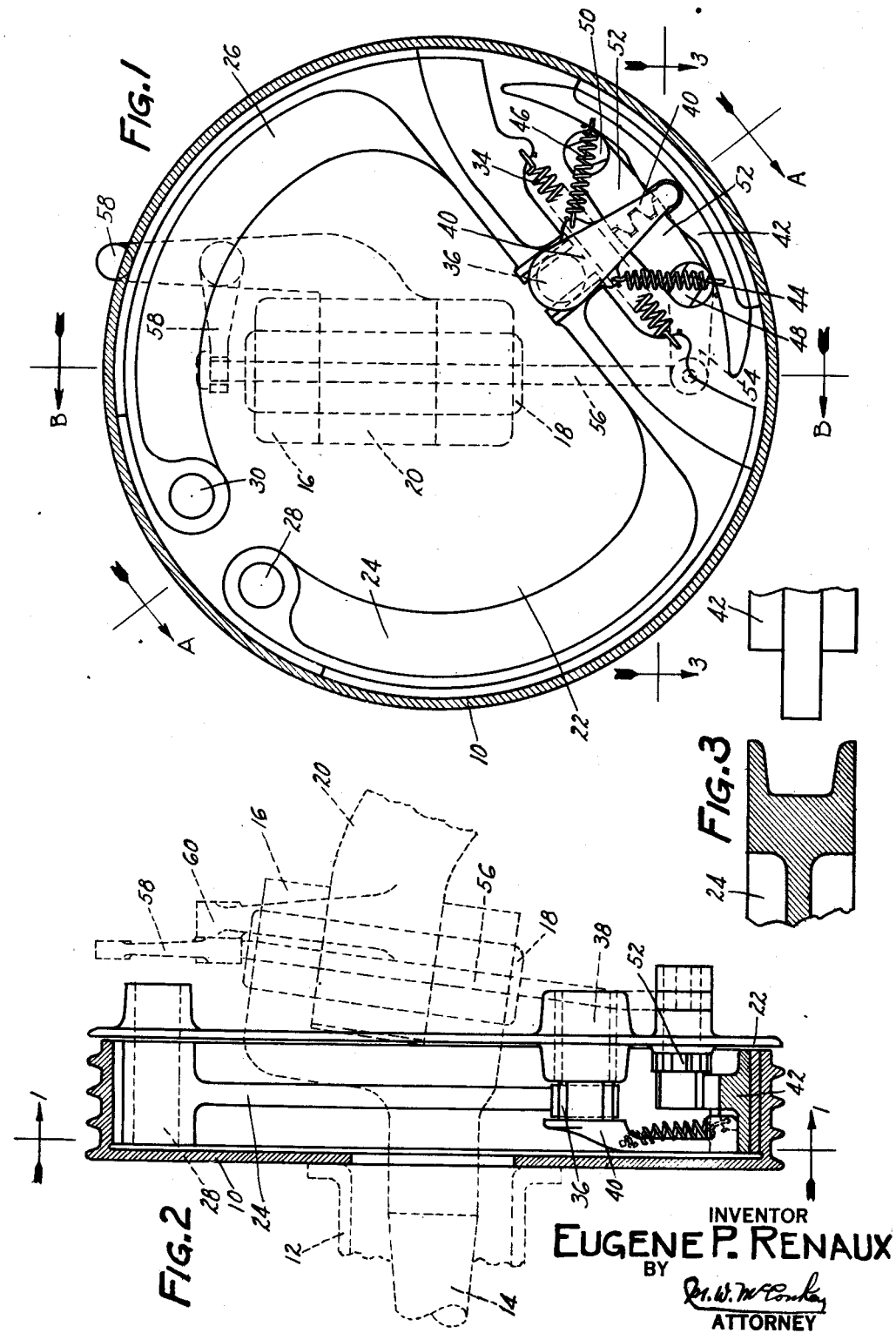
INVENTOR
EUGENE P. RENAUX
BY
*M. W. McConkey*
ATTORNEY Patented July 9, 1929.

1,720,494

UNITED STATES PATENT OFFICE.

EUGÈNE PROSPER RENAUX, OF PARIS, FRANCE, ASSIGNOR TO BENDIX BRAKE COMPANY, OF CHICAGO, ILLINOIS, A CORPORATION OF ILLINOIS.

BRAKE-OPERATING CONNECTION.

Application filed April 15, 1926. Serial No. 102,133.

This invention relates to brakes and is illustrated as embodied in novel operating connections including a servo device for applying a brake on a swivelled automobile wheel.

An object of the invention is to provide suitable connections for a servo device, such as a floating shoe engaging the brake drum and operating the friction means of the brake, which can be applied regardless of the angular position of the wheel and which does not interfere with swivelling the wheel. In one desirable arrangement the servo shoe is forced against the drum by novel means such as inter-connected spaced applying devices having an arm projecting substantially into the swivelling axis of the wheel and operated by connections jointed to the arm substantially in that axis. Preferably the connections include a tension member or the like extending along the swivelling axis of the wheel and operated by means shown as a bell-crank lever mounted at the top of the brake and having one arm intersecting the swivelling axis of the wheel and swivelled to one end of the tension member.

The above and other objects and features of the invention, including various novel combinations of parts and desirable particular constructions, will be apparent from the following description of one illustrative embodiment shown in the accompanying drawings, in which:

Figure 1 is a vertical section through the brake just inside the head of the brake drum and showing the brake shoes in side elevation;

Figure 2 is a section diametrically through the brake with parts in full lines on the section A—A of Figure 1 and with parts in dotted lines on the section B—B of Figure 1; and Figure 3 is a partial section on the line 3—3 of Figure 1, showing the adjacent ends of the servo shoe and one of the other brake shoes.

The illustrated brake includes a drum 10 having the usual peripheral cylindrical braking flange and rotating with a wheel the hub of which is shown at 12 and which is mounted on the spindle 14 of the knuckle 16, swivelled by a king-pin or the like 18, at one end of the front axle 20. At the open side of the drum is arranged a support such as a backing plate 22 carried by knuckle 16.

Within the drum is arranged suitable friction means shown as including a pair of shoes 24 and 26 anchored by being mounted on pivots 28 and 30 carried by the backing plate 22. The shoes are forced apart to apply the brake against the resistance of the return spring 34, by a suitable cam or the like 36 engaging wear plates on the ends of the shoes and mounted on a spindle 38 journalled in the backing plate and having at its end an operating lever 40 extending radially outward of the drum. The lower end of the lever 40 projects into a notch arranged approximately at the center of the servo shoe 42 engageable with the drum between the free ends of the shoes 24 and 26, so that the movement of the servo shoe in either direction forces the shoes 24 and 26 apart against the drum. The servo shoe 42 is forced outward against the drum against a pair of return springs 44 and 46 connected at their ends to the lever 40 and the ends of shoe 42, by novel spaced inter-connected devices such as cams 48 and 50 having operating arms 52 connected by rack or gear teeth at their ends. The cam 48 and its arm 52 are rocked to force the servo shoe against the drum, acting also through the cam 50, by an arm 54 extending into the swivelling axis of the wheel,—that is, into the axis of king-pin 18.

Substantially in this axis the arm 54 is connected to operating means such as a tension member 56 extending upwardly along the swivelling axis and through an axial opening in the king-pin 18. At its upper end the tension member 56 is swivelled to one arm of a bell-crank lever 58 fulcrumed on a support 60 carried by the axle 20. The arm 58 intersects the swivelling axis of the wheel so that there is a swivelled joint in that axis between the bell-crank lever and the tension member which permits swivelling of the wheel and which also permits the operation of the brake in any angular position of the wheel.

As shown in Figure 3, the shoes 24 and 26 may be notched out at their unanchored ends to permit the projecting ends of the servo shoe 42 to have a substantially longer range of movement.

While one illustrative embodiment of the invention has been described in detail, it is not my intention to limit the scope of the invention to that particular embodiment or otherwise than by the terms of the appended claims. Most of the subject-matter herein claimed is to be regarded as divided from my prior application No. 625,072, filed March 14, 1923.

I claim:

1. A front wheel brake comprising, in combination, a front axle, a knuckle, a king-pin connecting the knuckle and axle, a wheel having a brake drum and journalled on the knuckle, the brake drum substantially encircling the king-pin, retarding means supported by the knuckle in operative proximity to the drum, a servo device arranged between the king-pin and the drum; and driver-controlled means for operating the servo device which is constructed and arranged to permit swivelling movement of the knuckle and wheel about the king-pin.

2. A swivelled wheel having a brake and comprising, in combination therewith, a floating servo shoe arranged to operate the brake, an operating connection extending along the swivelling axis of the wheel, and means operated by said connection to apply the servo shoe.

3. A swivelled wheel having a brake and comprising, in combination therewith, a bell-crank lever mounted adjacent the upper part of the brake and having one arm intersecting the swivelling axis of the wheel, a tension member connected to said arm of the bell-crank lever and extending along the swivelling axis of the wheel, and servo means operated by tension on said member.

4. A swivelled wheel having a brake including a drum rotating with the wheel and comprising, in combination therewith, a servo shoe engageable with the drum and applying the brake, a pair of inter-connected spaced devices for forcing the servo shoe against the drum, an arm for operating said inter-connecting devices and extending into the swivelling axis of the wheel, and brake-operating connections jointed to said arm substantially in said swivelling axis.

5. A front wheel brake comprising in combination with a front wheel swivelled upon a king-pin and having a brake drum, brake devices including a servo shoe arranged spaced about the king-pin and a retarding device engageable with the drum and operatively connected with the servo shoe to be actuated thereby and brake operating mechanism to urge the servo shoe against the drum including a connection extending along the axis of the king-pin.

6. Brake mechanism for a swivelled wheel comprising in combination with a swivelled wheel provided with a brake drum, a pair of brake shoes within the drum, a servo shoe arranged between the opposed spaced ends of the pair of shoes and operating mechanism to urge the servo shoe against the drum including a connection arranged within the swivelling axis of the wheel.

7. A swivelled wheel having a brake including a drum rotating with the wheel, three brake shoes arranged end to end within the drum, one of said shoes arranged to float between the other two and connected therewith to exert servo pressure thereon, and brake operating mechanism connected with the servo shoe to urge the same against the drum including a part extending along the swivelling axis of the wheel.

8. A swivelled wheel having a brake including a drum rotating with the wheel, the brake shoes arranged end to end within the drum, one of said shoes arranged to float between the other two, a pivotally supported part connecting the servo shoe with the two shoes to urge them against the drum, and brake operating mechanism engaging the servo shoe on opposite sides of said pivotally supported part to urge the servo shoe against the drum and including a member extending along the swivelling axis of the wheel.

9. A swivelled wheel having a brake including a drum rotating with the wheel, the brake shoes arranged end to end within the drum, one of said shoes arranged to float between the other two, said other two shoes having opposed end portions overlapping the servo shoe, a part connecting the servo shoe with the overlapping end portions of the two shoes to urge said two shoes against the drum, operating mechanism engaging the servo shoe on opposite sides of said part provided with a member extending along the swivelling axis of the wheel.

10. Brake mechanism for a swivelled wheel comprising in combination with a swivelled wheel provided with a brake drum, a pair of brake shoes pivotally supported within the drum, a servo shoe arranged between spaced adjacent ends of the pair of shoes, said pair of shoes having their adjacent spaced ends provided with extensions projecting inwardly and beyond the ends of the servo shoe, a lever connecting such extensions with an intermediate part of the servo shoe, operating mechanism including spaced parts engaging the servo shoe on opposite sides of said lever and a part extending along the swivelling axis of the wheel.

11. Brake mechanism for a swivelled wheel comprising, in combination with an axle and a wheel swivelled thereon, a brake drum carried by the wheel, friction means including at least two arcuate friction members arranged end to end within the drum and having spaced apart ends disposed upon opposite sides of the swivelling axis of the wheel, jointed applying mechanism having a joint disposed in the swivelling axis of the wheel and engaging one of said members to urge it against the drum, said member being operatively connected with the other member to exert a servo thrust thereupon to urge it against the drum.

12. Brake mechanism for a swivelled wheel comprising, in combination with an axle and a wheel swivelled thereon, a brake drum carried by the wheel, friction means within the drum including at least two arcuate brake shoes having adjacent ends separated by a space disposed substantially opposite one end of the swivelling axis of the wheel, mechanism operable to urge one of said shoes against the drum having a part swivelling in the swivelling axis of the wheel, said shoe operatively connected with the other shoe to exert a servo thrust thereon to apply it to the drum.

13. Brake mechanism for a swivelled wheel comprising, in combination with an axle and a wheel swivelled thereon for turning, a brake drum carried by the wheel, a plurality of brake shoes arranged end to end within the drum and at least one of which is a servo shoe positioned between the spaced apart brake drum engaging ends of two of the other shoes and spaced from one of them so that the interval between their adjacent ends is located at one end of the swivelling axis of the wheel, said servo shoe connected with at least one of said other shoes to exert a servo thrust thereon to apply the same to the drum, and operating mechanism for applying the servo shoe to the drum having a part journaled substantially in the swivelling axis of the wheel.

In testimony whereof, I have hereunto signed my name.

EUGÈNE PROSPER RENAUX.